United States Patent [19]

Abe et al.

[11] Patent Number: 6,017,610
[45] Date of Patent: Jan. 25, 2000

[54] CONDUCTIVE LAMINATE

[75] Inventors: Kazuhiro Abe; Shigeji Konagaya; Chikao Morishige; Atsushi Hoshio, all of Ohtsu, Japan

[73] Assignee: Toyo Boseki Kabushiki Kaisha, Osaka, Japan

[21] Appl. No.: 08/989,300

[22] Filed: Dec. 11, 1997

Related U.S. Application Data

[63] Continuation-in-part of application No. PCT/JP97/00955, Mar. 21, 1997.

[51] Int. Cl.$^7$ .................................................. B32B 3/00
[52] U.S. Cl. ........................................ 428/195; 428/411.1
[58] Field of Search ................................ 428/64.1, 195, 428/323, 332, 411.1; 525/504, 506; 252/500

[56] References Cited

U.S. PATENT DOCUMENTS 5,556,700  9/1996  Kaneto et al. ........................... 428/332
5,589,108  12/1996  Shimizu et al. ......................... 252/500

*Primary Examiner*—Bruce H. Hess
*Assistant Examiner*—Hong J. Xu
*Attorney, Agent, or Firm*—Morrison Foerster LLP

[57] ABSTRACT

A conductive laminate comprising an inorganic or organic substrate and a conductive layer formed on at least a part of a surface of said substrate, the conductive layer having a surface resistance at 25° C., under 15% RH atmosphere of $10^6$–$10^{12}$ Ω/□, a charge attenuation time of not more than 2 sec and a variation in surface resistance after heating at 250° C. for one minute of not more than 5.0. The present invention provides an economical conductive laminate having antistatic performance even under low humidity, which performance being sufficient to overcome problems caused by static electricity, superior heat resistance and transparency, as well as superior characteristics of a structure such as a thermoplastic film.

17 Claims, No Drawings

CONDUCTIVE LAMINATE

This is a continuation in part of application No. PCT/JP97/00955 filed Mar. 21, 1997.

TECHNICAL FIELD OF THE INVENTION

The present invention relates to a conductive laminate. More particularly, the present invention relates to a conductive film, a conductive sheet, a conductive fiber and the like, which are superior in antistatic properties even under low humidity, and among others, to a conductive film, a conductive sheet and a conductive fiber made from a thermoplastic resin, and especially a conductive film, a conductive sheet and a conductive fiber made from a polyester. Specifically recited in this connection are industrial films and sheets, such as magnetic tape, OHP, shield material, LCD, support for photographs, thermosensitive sheet and the like; packaging films and sheets, such as carrier tape, tray, magazine, IC.LSI package and the like; clothing fibers, such as antistatic work clothing, uniform, sanitary gown and the like; fibers for interior fiber products, such as carpet, curtain, upholstery and the like; fibers for automobile interior materials, such as car seat, seat belt, floor mat, ceiling material and the like; fibers for hat and bag; fibers for fiber products for industrial material; sheets made from the aforementioned fibers; and the like.

BACKGROUND OF THE INVENTION

Thermoplastic films, sheets and fibers made from polyester, nylon and the like are superior in heat resistance, dimensional stability, mechanical strength and the like, so that they have been conventionally used widely and in large scale as films and sheets for packaging and industrial purposes; fibers including filament and/or staple fiber; and sheets of knitted fabrics made of said fibers, non-woven fabric and the like. While polyethylene, polypropylene, polyvinyl chloride and the like are inferior in heat resistance, they are still generally used for packaging, due to their superior formality, economical aspect and the like. However, a synthetic resin is generally hydrophobic and easily causes static electricity on the surface of a structure that it constitutes. Consequently, it easily attaches dust and so on to the surface thereof, thereby creating various troubles.

In generality, a surfactant is used for preventing electrification of film, sheet, fiber and the like. However, surfactants cannot provide a surface resistance sufficient (not more than $10^{10}$ $\Omega/\square$) to prevent attachment of dirt, dust and the like, and the antistatic performance thereof is subject to variation according to ambient humidity and moisture. A surfactant lowers the surface resistance of a film and the like, but low humidity strikingly increases the resistance to the extent that the desired antistatic performance cannot be attained.

As a result, attaching of the dust to the surface of a film, sheet and the like follows, causing various troubles. In a technologically highly advanced society of today, film, sheet and the like are increasingly desired, which are free of problems caused by static electricity even under low humidity environment. To meet this requirement, an antistatic agent has been demanded which gives a surface resistance of not more than $10^{10}$ $\Omega/\square$ even under low humidity. The material giving such low surface resistance is known to be a conductive polymer such as polyaniline, polypyrrole and the like. Inasmuch as these are soluble in certain organic solvents but insoluble or undispersible in water and a mixed solvent of water/alcohol, a conductive polymer having a sulfonic acid group bonded to an aromatic ring thereof is used. In addition, since they fail to provide sufficient film characteristics by a single use thereof, a water soluble or water dispersible resin is mixed with the conductive polymer. When a resin having fine compatibility with sulfonated polyaniline is used, however, the desired surface resistance cannot be achieved, whereas when the desired surface resistance has been achieved, the surface becomes cloudy, impairing transparency inherent to a film made from such polymer.

SUMMARY OF THE INVENTION

As a result of the study and investigation in an attempt to solve the above-mentioned problems, the present invention now provides a conductive laminate having antistatic capability sufficient to overcome problems caused by static electricity even under low humidity, heat resistance and transparency, at low costs, while retaining superior characteristics of a formed structure such as a thermoplastic film. That is, the present invention provides the following.

(1) A conductive laminate comprising an inorganic or organic substrate and a conductive layer formed on at least a part of a surface of said substrate, the conductive layer having a surface resistance at 25° C., under 15% RH atmosphere of $10^{6-10^{12}}$ $\Omega/\square$, a charge attenuation time of not more than 2 sec and a variation in surface resistance after heating at 250° C. for one minute of not more than 5.0.

(2) The conductive laminate of the above-mentioned (1), wherein the conductive layer comprises a conductive polymer.

(3) The conductive laminate of the above-mentioned (1), wherein the conductive layer comprises a surfactant.

(4) The conductive laminate of the above-mentioned (1), wherein the inorganic or organic substrate is a film or sheet.

(5) The conductive laminate of the above-mentioned (1), wherein the inorganic or organic substrate is a fiber.

(6) The conductive laminate of the above-mentioned (2), wherein the conductive polymer is a polyaniline or a derivative thereof.

(7) The conductive laminate of the above-mentioned (2), wherein the conductive layer comprising a conductive polymer further contains a thermoplastic resin.

(8) The conductive laminate of the above-mentioned (4), wherein the film or sheet is thermoplastic.

(9) The conductive laminate of the above-mentioned (6), wherein the polyaniline has a sulfonic acid group.

(10) The conductive laminate of the above-mentioned (6), wherein the polyaniline is a copolymer comprising an alkoxy-substituted amino benzenesulfonic acid as a main component.

(11) The conductive laminate of the above-mentioned (6), wherein the polyaniline is a copolymer comprising an aminoanisolesulfonic acid as a main component.

(12) The conductive laminate of the above-mentioned (7), wherein the thermoplastic resin has a hydrophilic group.

(13) The conductive laminate of the above-mentioned (7), wherein the thermoplastic resin has at least one group selected from the group consisting of an ionic group, a carboxyl group, a hydroxyl group, a sulfonic acid group, an amide group, an acid anhydride group, a glycidyl group, a chlorine atom and a polyalkylene glycol group.

(14) The conductive laminate of the above-mentioned (7), wherein the thermoplastic resin is a water soluble or water dispersible resin having an anionic group.

(15) The conductive laminate of the above-mentioned (7), wherein the thermoplastic resin is a copolymerized polyester having at least one member selected from the group consisting of a sulfonic acid group and an alkali metal salt group thereof.

(16) The conductive laminate of the above-mentioned (7), wherein the thermoplastic resin is a copolymerized polyester obtained by copolymerizing at least one member selected from the group consisting of 5-sulfoisophthalic acid and 5-alkalisulfoisophthalate in a proportion of 1–10 mol % of the entire acid component.

(17) The conductive laminate of the above-mentioned (8), wherein the thermoplastic film or sheet is made from a member selected from the group consisting of polyester, polyamide, polyolefin and polystyrene.

(18) The conductive laminate of the above-mentioned (8), wherein the thermoplastic film or sheet is a multi-layer film or sheet.

(19) The conductive laminate of the above-mentioned (17), wherein the film or sheet has voids.

DETAILED DESCRIPTION OF THE INVENTION

The present invention is described in detail in the following. The conductive laminate of the present invention comprises an inorganic or organic substrate and a conductive layer formed at least on a part of the surface of the substrate.

The organic substrate to be used in the present invention is suitably a thermoplastic film, sheet or fiber. Examples of the thermoplastic film and sheet include those made from a single polymer of polyester, nylon, polypropylene, polyethylene, polystyrene and the like, and those obtained by mixing or laminating them. Alternatively, a film or sheet having voids may be used, which is obtained by at least mono axially orienting a sheet prepared by mixing a thermoplastic resin incompatible with the above-mentioned thermoplastic resin. The thermoplastic fiber is exemplified by synthetic fibers of polyester, polyamide, polyacrylonitrile, acetate, polyolefin (e.g., polyethylene, polypropylene and the like), polyphenylene sulphite, polyimide, meta-aramid, para-aramid, polybenzoxazole and the like; semi synthetic fibers such as rayon, polynosic, promix and the like; natural fibers such as cotton, hemp, wool and the like; and the like. The above-mentioned fibers may be mixed (blended, combined yarn, mixed woven, knitted, non-woven and the like) to give a fiber or sheet.

The inorganic substrate to be used in the present invention may be, for example, film, sheet, fiber and the like, which are made from glass, alumina, aluminum nitride, carbon, silicon carbide and the like.

When the above-mentioned substrate is a film or sheet, the thickness thereof is generally 5–1,000 μm, preferably 10–300 μm, and when the substrate is a fiber, the diameter thereof is generally 1–1,000 μm, preferably 2–100 μm.

A conductive layer is formed on at least a part of the surface of such substrate. When the substrate is a film or sheet, a conductive layer is laminated on at least one side thereof, and when the substrate is a fiber, a conductive layer is formed on at least a part thereof as a coating layer.

In the present invention, the conductive layer preferably contains a conductive polymer. The conductive polymer to be used in the present invention is soluble in water or an organic solvent. Examples thereof include polyaniline and derivatives thereof (e.g., sulfonated polyaniline and the like), polypyrrole soluble in organic solvent (i.e., long chain alkyl-substituted polypyrrole), polythiophene, derivatives thereof and the like, with preference given to sulfonated polyaniline having superior solubility in water.

In addition, a polyaniline solution may be used, which is obtained by adding an inorganic acid or a sulfonic acid group-containing compound to a dispersion of polyaniline or a derivative thereof. The inorganic acid here is exemplified by hydrochloric acid, perchloric acid, sulfuric acid, nitric acid and the like; the sulfonic acid group-containing compound is exemplified by benzene sulfonic acid, naphthalenesulfonic acid, polystyrenesulfonic acid and the like.

The above-mentioned sulfonated polyaniline, preferably a sulfonated polyaniline copolymer comprising, as a main component, an alkoxy-substituted amino benzenesulfonic acid, particularly, an amino anisole-sulfonic acid, is preferably used as a basic material of the conductive layer of the present invention.

Examples of the aminoanisolesulfonic acids include 2-amino anisole-3-sulfonic acid, 2-amino anisole-4-sulfonic acid, 2-amino anisole-5-sulfonic acid, 2-amino anisole-6-sulfonic acid, 3-amino anisole-2-sulfonic acid, 3-amino anisole-4-sulfonic acid, 3-amino anisole-5-sulfonic acid, 3-amino anisole-6-sulfonic acid, 4-amino anisole-2-sulfonic acid, 4-amino anisole-3-sulfonic acid and the like. It is also possible to use a compound wherein an alkoxy, such as ethoxy, iso-propoxy and the like, is substituted instead of methoxy of the above-mentioned anisoles. Of these, preferred are 2-amino anisole-3-sulfonic acid, 2-amino anisole-4-sulfonic acid, 2-amino anisole-5-sulfonic acid, 2-amino anisole-6-sulfonic acid, 3-amino anisole-2-sulfonic acid, 3-amino anisole-4-sulfonic acid and 3-amino anisole-6-sulfonic acid.

The above-mentioned sulfonated polyaniline copolymer has a sulfonic acid group in a proportion of preferably not less than 70 mol %, more preferably not less than 80 mol %, particularly preferably 100 mol % relative to the aromatic ring. An aromatic ring having a sulfonic acid group and an aromatic ring that does not may be coexistent or arrayed alternately. When the sulfonic acid group content is less than 70 mol %, said copolymer only insufficiently dissolves or disperses in water, alcohol, mixed solvent thereof and the like, to ultimately cause poor coating properties to a substrate and poor extensibility thereon, thus markedly degrading the conductivity of the coating layer obtained.

The number average molecular weight of the above-mentioned sulfonated polyaniline copolymer is preferably 300–500,000, which is more preferably 1,000–100,000 in view of the aforesaid solubility in a solvent and the strength of the coating layer obtained.

The above-mentioned sulfonated polyaniline copolymer is used in a proportion of preferably 0.01–10 parts by weight, more preferably 0.1–2 parts by weight, per 100 parts by weight of the solvent. When the content is less than 0.01 part by weight, the viscosity tends to fall and so do the coating properties, which in turn produces a propensity toward occurrence of pinholes in the coating layer and thus, poor conductivity of the coating layer. When the content exceeds 10 parts by weight, solubility and dispersibility of said copolymer in water or a water/organic solvent become poor to adversely affect coating properties. In addition, viscosity becomes higher and the copolymer easily becomes a gel. Therefore, the copolymer tends to be associated with poor long time storability in a solution state.

The solvent to be used in the present invention may be any as long as it does not dissolve or swell the substrate (e.g., polyester film and the like). It is desirable to use water or a mixed solvent with organic solvent, such as water/alcohol and the like, in consideration of the influence to the environment in which it is used. In addition, the coating properties to the substrate, as well as the conductivity of the coating layer may be improved. The organic solvents preferably used are alcohols such as methanol, ethanol, propanol, isopropyl alcohol and the like; ketones such as acetone, methyl ethyl ketone, methyl isobutyl ketone and the like; cellosolve such as methyl cellosolve, ethyl cellosolve and the like; propylene glycols such a glycol, ethylpropyl glycol, ethylpropylene glycol and the like; amides such as dimethylformamide, dimethylacetamide and the like; pyrrolidone such as N-methylpyrrolidone, N-ethylpyrrolidone and the like; and the like. These are mixed with water in an optional ratio before use. Examples of the combination are water/methanol, water/ethanol, water/propanol, water/isopropanol, water/ethylpropylene glycol, water/ethylpropylene glycol and the like. The mixing ratio is preferably water/organic solvent=1/10–10/1.

The conductive layer of the present invention preferably contains a thermoplastic resin as well, in view of the adhesion properties to the substrate and the extensibility and strength of the conductive layer. The thermoplastic resin to be used in the present invention preferably has a hydrophilic group, particularly, at least one group selected from ionic group (e.g., sodium sulfonate, sodium carboxylate and the like), carboxyl group, hydroxyl group, sulfonic acid group, amide group, acid anhydride group, glycidyl group, chlorine atom and polyalkylene glycol group. More preferably, it is a water soluble or water dispersible resin having an anion group, particularly preferably a copolymerized polyester having at least one group from sulfonic acid group and alkali metal salt group thereof.

The copolymerized polyester having at least one group from sulfonic acid group and alkali metal salt group thereof (hereinafter to be referred to as a sulfonic acid group-containing copolymerized polyester and expressed using the term "SO$_3$H-containing PES" in Tables to be mentioned later) is a polyester copolymerized with a dicarboxylic acid component and/or a glycol component having, as a part of the dicarboxylic acid component and/or glycol component, at least one group from sulfonic acid group and alkali metal salt group thereof. In particular, a copolymerized polyester obtained by using an aromatic dicarboxylic acid component having at least one group from sulfonic acid group and alkali metal salt group thereof in a proportion of 1–10 mol % of the entire acid component is preferable for improved coating properties and extensibility of a coating solution for a conductive layer, as well as hardness of the conductive layer. Examples of such dicarboxylic acid include 5-sulfoisophthalic acid and sodium 5-sulfoisophthalate.

Examples of other dicarboxylic acid component to be used for preparing such copolymerized polyester include terephthalic acid, isophthalic acid, phthalic acid, p-β-oxyethoxybenzoic acid, 2,6-naphthalenedicarboxylic acid, 4,4'-dicarboxydiphenyl, 4,4'-dicarboxy-benzophenone, bis(4-carboxyphenyl)ethane, adipic acid, sebasic acid, cyclohexane-1,4-dicarboxylic acid and the like. In view of an improved surface hardness of the conductive laminate of the present invention, terephthalic acid and isophthalic acid are preferably used.

The glycol component to be used to prepare the above-mentioned copolymerized polyester is mainly ethylene glycol. Besides this, propylene glycol, butanediol, neopentyl glycol, diethylene glycol, cyclohexanedimethanol, adduct of bisphenol A with ethylene oxide, polyethylene glycol, polypropylene glycol, polytetramethylene glycol and the like may be used. Of these, when ethylene glycol, propylene glycol, butanediol, neopentyl glycol, diethylene glycol, cyclohexanedimethanol and the like are used as a copolymerizable component, the compatibility between the copolymerized polyester obtained and a conductive polymer, sulfonated polyaniline, is advantageously improved, so do surface resistance, strength and transparency of the coating layer.

A polymer obtained by graft polymerization of a vinyl monomer having a hydrophilic group, to the side chain of the polyester may be used as a thermoplastic resin, whereby the transparency of the coating layer and adhesion properties of the coating layer to the substrate can be improved. A vinyl monomer having a hydrophilic group may be graft polymerized to the side chain of the aforementioned sulfonic acid group-containing copolymerized polyester.

The vinyl monomer having a hydrophilic group, which may be graft polymerized to the side chain of polyester, is exemplified by those having carboxyl group, alkyloxycarbonyl group, hydroxyl group, sulfonic acid group, amide group, epoxy group and the like; those having acid anhydride group, glycidyl group, chlorine atom and the like as a group capable of converting to a hydrophilic group; and others. Of these, most preferred are those having carboxyl group.

For example, monomers having carboxyl group or a salt thereof, such as acrylic acid, methacrylic acid and salts thereof and the like; alkyl acrylates such as methyl acrylate, ethylacrylate, n-propylacrylate, isopropylacrylate, n-butylacrylate, t-butylacrylate and the like; alkylmethacrylates such as methyl methacrylate, ethyl methacrylate, n-propyl methacrylate, isopropyl methacrylate, n-butyl methacrylate, t-butyl methacrylate and the like; hydroxy-containing monomers such as 2-hydroxyethylacrylate, 2-hydroxyethylmethacrylate and the like; amide-containing monomers such as acrylamide, methacrylamide, N-methylacrylamide, N-methylmethacrylamide, N-methylolacrylamide, N-methylolmethacrylamide, N-methoxymethylacrylamide, N-methoxymethylmethacrylamide, N,N-dimethylolacrylamide, N-phenylacrylamide and the like; epoxy-containing monomers such as glycidylacrylate, glycidyl methacrylate and the like; and the like may be used. Other monomers having a hydrophilic group are exemplified by glycidyl-containing monomers such as allyl glycidyl ether and the like; monomers having sulfonic acid group or a salt thereof, such as styrenesulfonic acid, vinylsulfonic acid and salts thereof; monomers having carboxyl group or a salt thereof, such as crotonic acid, itaconic acid, maleic acid, fumaric acid and salts thereof; monomers having acid anhydride group, such as maleic anhydride, itaconic anhydride and the like; and others.

These may be used concurrently with other monomers, such as vinyl isocyanate, allyl isocyanate, styrene, vinyl methyl ether, vinyl ethyl ether, acrylonitrile, methacrylonitrile, vinylidene chloride, vinyl acetate, vinyl chloride and the like, an optional number of which is used for copolymerization.

The molar ratio of monomer having a hydrophilic group to other monomer is preferably 30/70–100/0. When the ratio of the monomer having a hydrophilic group is less than 30 mol %, the effect of increasing the transparency of the coating layer may not be exhibited sufficiently.

A monomer having a hydrophilic group may be graft polymerized to a polyester by a known method. Typical methods are as follows.

For example, radical polymerization wherein radical is generated in the main chain polyester using light, heat, radiation and the like, and monomer is graft polymerized; cation polymerization wherein cation is generated using a catalyst such as $AlCl_3$, $TiCl_4$ and the like; anion polymerization wherein anion is generated using metal Na, metal Li and the like; and the like are exemplified.

In addition, a method comprising introducing a polymerizable unsaturated double bond into the main chain polyester and reacting a vinyl monomer therewith may be used. The monomer having a polymerizable unsaturated double bond, which is used for this method may be fumaric acid, maleic acid, maleic anhydride, itaconic acid, citraconic acid, 2,5-norbornendicarboxylic anhydride, tetrahydrophthalic anhydride and the like. Of these, most preferred are fumaric acid, maleic acid and 2,5-norbornendicarboxylic acid.

Other methods include a method comprising reacting the main chain polyester, into which a functional group has been introduced into the side chain, with a branch polymer having, at an end, a group reactive with the above-mentioned functional group. For example, a polymer having, at a side chain, a hydrogen donor group such as —OH, —SH, —$NH_2$, —COOH, —$CONH_2$ and the like, and a vinyl polymer having, at one end, a hydrogen receptor group such as —N=C=O, —CH=C=O,

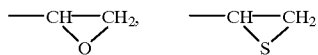

and the like are reacted, or a reaction using a converse combination of the hydrogen donor group and hydrogen receptor group is carried out.

The vinyl monomer to be grafted with the main chain polyester of the present invention preferably has a weight ratio of polyester/vinyl monomer of 40/60–95/5, more preferably 55/45–93/7 and most preferably 60/40–90/10. When the main chain polyester has a weight ratio of less than 40%, a vinyl monomer remains from incomplete reaction, so that heat resistance, proccessability and the like inherently possessed by polyester may be impaired. When the main chain polyester has a weight ratio of 95% or above, the objective improvement in adhesion properties and transparency may not be fully achieved.

In addition, dicarboxylic acid component and glycol component having a small amount of amide bond, urethane bond, ether bond, carbonate bond and the like may be added as a polymerizable component of polyester.

For an improved surface hardness of the conductive layer of the present invention, a monomer having polycarboxyl group such as trimellitic acid, trimesic acid, pyromellitic acid, trimellitic anhydride and the like may be added as a copolymerizable component of the above-mentioned polyester in a proportion of not more than 5 mol % of the entire acid component. When it exceeds 5 mol %, the resultant polyester becomes thermally instable and easily becomes a gel, which is unfavorable as a component of the conductive layer of the present invention.

The sulfonic acid group-containing copolymerized polyester can be obtained by ester exchange, condensation polymerization and the like, using, for example, the above-mentioned dicarboxylic acid component, the above-mentioned glycol component, and where necessary, the above-mentioned monomer having polycarboxyl group, according to a conventional method. The obtained sulfonic acid-containing copolymerized polyester can be prepared into an aqueous solution or aqueous dispersion by stirring with heating in a solvent such as n-butyl cellosolve and gradually adding water with stirring.

The grafted polyester can be obtained by ester exchange, condensation polymerization and the like, using, for example, an autoclave according to a conventional method. The obtained grafted polyester can be prepared into an aqueous solution or aqueous dispersion by stirring with heating in a solvent such as ethylene glycol monobutyl ether and gradually adding water with stirring.

The amount of the thermoplastic resin to be used in the present invention is preferably 100–2,000 parts by weight, more preferably 500–1,200 parts by weight, and most preferably 700–1,000 parts by weight per 100 parts by weight of sulfonated polyaniline, which is a conductive polymer, in consideration of the conductivity and mechanical properties of the conductive laminate to be obtained.

The conductive layer of the conductive laminate of the present invention is generally formed by coating a solution or dispersion of a conductive polymer, thermoplastic resin and the like in a solvent on a desired substrate surface. The solvent to be used here may be any solvent as long as it does not dissolve or swell the substrate (e.g., polyester film and the like). It is desirable to use water or a mixed solvent with organic solvent in consideration of the influence to the environment in which it is used. In addition, the coating properties to the substrate, as well as the conductivity of the coating layer may be improved.

The above-mentioned organic solvent is preferably exemplified by alcohols such as methanol, ethanol, propanol, isopropyl alcohol and the like; ketones such as acetone, methyl ethyl ketone, methyl isobutyl ketone and the like; cellosolve such as methyl cellosolve, ethyl cellosolve and the like; propylene glycols such as ethylpropylene glycol, ethylpropylene glycol and the like; amides such as dimethylformamide, dimethylacetamide and the like; pyrrolidone such as N-methylpyrrolidone, N-ethylpyrrolidone and the like; and the like. These are mixed with water in an optional ratio before use.

Examples of the combination are water/methanol, water/ethanol, water/propanol, water/isopropanol, water/ethylpropylene glycol, water/ethylpropylene glycol and the like. The mixing ratio is preferably water/organic solvent= 1/10–10/1.

While the amount of solvent to be used is not particularly limited, it is generally 1,000–1,000,000 parts by weight per 100 parts by weight of the conductive polymer sulfonated polyaniline. When the solvent content is extremely large, the viscosity tends to fall and the coating properties tend to become poor, which in turn produces propensity toward occurrence of pinholes in the coating layer and thus, poor conductivity of the coating layer. When the content is extremely small, solubility and dispersibility of said sulfonated polyaniline in the above-mentioned solvent become poor to adversely affect coating properties. In addition, viscosity becomes higher and the copolymer easily becomes a gel. Therefore, it tends to face difficulty in storing for a long time in a solution state.

The conductive layer of the present invention is superior in coating properties and extensibility, and the surface hardness of the obtained conductive layer is fine even when only the above-mentioned component is contained. A combined use of a surfactant and/or polymer compound soluble in the above-mentioned solvent enables application to a thermoplastic substrate having poor wettability.

Examples of the above-mentioned surfactant include, but not limited to, nonionic surfactants such as polyoxyethyleneoctylphenyl ether, polyoxyethylenealkyl ether, polyoxyethylenesorbitan fatty acid ester and the like; and fluorine surfactants such as fluoroalkylcarboxylic acid, perfluoroalkylcarboxylic acid, perfluoroalkylbenzenesulfonic acid, perfluoroalkyl quaternary ammonium, perfluoroalkylpolyoxyethylene ethanol and the like.

The amount of the surfactant to be used in the present invention is not less than 0.001 part by weight and not more than 100 parts by weight, per 100 parts by weight of sulfonated polyaniline. When the above-mentioned surfactant exceeds 10 parts by weight and when the substrate is a film or sheet, the surfactant in the coating layer strikes through to the non-coated surface of the substrate, thus possibly posing a problem in secondary processing and the like.

As the above-mentioned polymer compound, for example, water soluble resins such as polyacrylamide, polyvinylpyrrolidone and the like; water soluble or water dispersible copolymerized polyester having a hydroxyl group or carboxyl group; polyacrylic acid resins such as polyacrylic acid, polymethacrylic acid and the like; polyacrylate resins such as polyacrylate, polymethacrylate and the like; polyester resins such as polyethyleneterephthalate, polybutyleneterephthalate and the like;

polystyrene resins such as polystyrene, poly-α-methylstyrene, polychloromethylstyrene, polystyrenesulfonic acid, polyvinyl phenol and the like; polyvinyl ether resins such as polyvinylmethyl ether, polyvinylethyl ether and the like; polyvinyl alcohols such as polyvinyl alcohol, polyvinyl formal, polyvinyl butyral and the like; phenol resins such as novolak, resole and the like; and other compounds can be used. Of these, preferred are a water soluble or water dispersible copolymerized polyester having a hydroxyl group or carboxyl group and polyvinyl alcohols, from the aspect of the compatibility with the above-mentioned sulfonated polyaniline, which is a conductive polymer, as well as adhesiveness of the substrate made from polyester and the like.

The amount of the above-mentioned polymer compound is preferably 0–1,000 parts by weight, more preferably 0–500 parts by weight, per 100 parts by weight of sulfonated polyaniline. When it exceeds 1,000 parts by weight, the sulfonated polyaniline may fail to assume conductivity and thus, inherent antistatic effect may not be exhibited.

The conductive layer of the conductive laminate of the present invention may contain various additives besides the above-mentioned. Examples thereof include inorganic particles such as $TiO_2$, $SiO_2$, kaolin, $CaCO_3$, $Al_2O_3$, $BaSO_4$, ZnO, talc, mica, complex particles and the like; and organic particles of polystyrene, polyacrylate, crosslinked polystyrene, crosslinked polyacrylate and the like. In an attempt to further increase the conductivity, inorganic conductive filler, such as powders of $SnO_2$ (tin oxide) and ZnO (zinc oxide), inorganic particles ($TiO_2$, $BaSO_4$ and the like) coated with them, conductive carbon fillers such as carbon black, graphite, carbon fiber and the like may be added.

The content of the above-mentioned additives is preferably not more than 4,000 parts by weight per 100 parts by weight of sulfonated polyaniline.

When it exceeds 4,000 parts by weight, the conductive layer will have greater viscosity which may cause non even coating.

A conductive layer is laminated on a thermoplastic film or sheet by gravure roll coating, reverse roll coating, knife coater method, dip coating, spin coating and the like, where the method is not particularly limited. It is also possible to select an appropriate method for this purpose from an in-line coating method wherein a film or sheet is coated concurrently in a film-forming step and an off-line coating method wherein the coating is performed independently after the film forming. The sulfonated polyaniline to be used in the present invention is instable at a high temperature of not less than 250° C., but has fine heat stability for about 3 minutes at 200° C. Therefore, heating at 200° C. for a short time does not generally affect conductivity in an adverse manner, though subject to change depending on the kind of the coexistent polymer compound and additive.

When the substrate is a fiber, moreover, a conductive coating layer may be formed on the surface of an extrudate filament by coating an aqueous or oily emulsion, which is a coating solution, by the use of a guide roll after melt spinning, or by dipping the yarn into a coating solution. A conductive layer may be laminated on a sheet made from fiber by back coating method, dipping method, spraying method and the like.

The thickness of the conductive layer, when the substrate is a film or sheet, is preferably 0.01–10 μm, more preferably 0.05–1 μm, and when the substrate is a fiber, it is preferably 0.01–5 μm, more preferably 0.05–5 μm.

When the conductive laminate of the present invention is used as an industrial or packaging film or sheet; or a fiber for clothing, interior products, interior materials, industrial materials and the like, antistatic properties can be imparted even under low humidity, while retaining high surface strength and transparency.

The conductive laminate of the present invention has a surface resistance of the conductive layer at 25° C., under 15% RH atmosphere, of $10^6$–$10^{12}$ Ω/□, preferably $10^7$–$10^{11}$ Ω/□, more preferably $10^8$–$10^{10}$ Ω/□; the charge attenuation time of the conductive layer of not more than 2 sec, preferably not more than 0.5 sec, more preferably not more than 0.2 sec; and a variation of the surface resistance of said conductive layer after heating same at 250° C. for one min, of not more than 5.0, preferably not more than 3.0, more preferably not more than 2.0.

The surface resistance here shows difficulty in flowing the electricity through the surface of the conductive layer, and the charge attenuation time shows how easily once-electrified charge escapes, both of which are used as indices of antistatic properties. The variation in surface resistance shows retention of antistatic properties after heating.

The conductive laminate of the present invention can be obtained by appropriately combining the following factors: use of sulfonated polyaniline (e.g., sulfonated polyaniline containing alkoxy-substituted aminobenzenesulfonic acids such as aminoanisolesulfonic acids and the like as a main component) as a component of the conductive layer, for example, as a conductive polymer; use of sulfonic acid group-containing copolymerized polyester or the above-mentioned graft polyester as a thermoplastic resin; use of specific contents of said sulfonated polyaniline and sulfonic acid group-containing copolymerized polyester; use of water or a water/alcohol mixed solvent as a solvent of the coating solution for a conductive layer; specific concentration range of coating solution for a conductive layer; addition of specific amounts of surfactant, polymer compound and the like as a component of the conductive layer; drying after application of a coating solution at a specific temperature; and the like.

The present invention is described in more detail by way of Examples and Comparative Examples, which should not be construed as limiting the invention, wherein "parts"

means "parts by weight". In the present invention, the following evaluation methods were used.

(1) Transparency

The surface of the conductive layer of the conductive laminate was irradiated with Brom video light, and transparency (presence or absence of whitening) was evaluated as follows (determination at 25° C., 60% RH).

No whitening in the conductive layer: ○

Partial whitening in the conductive layer: X (2) Surface Resistance

A voltage of 500 V was applied to the conductive layer of the conductive laminate, and surface resistance was measured using a surface resistance measuring device manufactured by Mitsubishi Chemical Corporation under the conditions of 25° C., 15% RH and 60% RH.

(3) Charge Attenuation Time

Using a static decay meter manufactured by US Electrotech Systems, the conductive layer of a conductive laminate was sandwiched between electrodes and a voltage of 5.0 kV was applied. When the charge reached 5.0 kV, the electrodes were earthed, and the time t necessary for the applied voltage to become 0.05 kV after ear thing was measured at 25° C., under 15% RH atmosphere.

(4) Adhesion Properties of Conductive Layer to Thermoplastic Substrate

An adhesive tape (trademark Serotepu, manufactured by NICHIBAN COMPANY, LIMITED) was peeled off from the conductive layer surface, and the release of the conductive layer from the thermoplastic film was evaluated as follows.

The conductive layer was not released and, therefore, did not adhere to the adhesive tape.: ○

The conductive layer was slightly released and adhered to the adhesive tape.: Δ

The conductive layer was completely released and adhered to the adhesive tape.: X (5) Resistance to Scuffing The conductive layer surface was rubbed with gauze for 10 reciprocations under a load of 200 g, and the scratches on the conductive layer surface was evaluated as follows.

No scratches on conductive layer surface: ○

Several narrow scratches on conductive layer surface: Δ

Visually discernible scratches on conductive layer surface: X (6) Strike-through Properties The conductive layer surface and a thermoplastic film where a conductive layer had not been formed were superimposed, and a load of 170 kg/cm$^2$ was applied at room temperature for 10 min. Whether or not a part of the conductive layer was stricken through to the other side of the film was visually observed and evaluated through surface resistance value.

(7) water resistance

The conductive layer surface was wiped 10 times under a certain pressure with a commercially available tissue impregnated with water. When the conductive layer was not wiped off at all, it was expressed by ○, when the conductive layer was slightly wiped off, it was expressed by Δ, and when the conductive layer was completely wiped off, it was expressed by X.

(8) Heat Resistance

The conductive laminate was heated at 250° C. for one minute using a HIGH-TEMP OVEN PHH-1 manufactured by ESPEC, and surface resistance was determined in the same manner as in the above-mentioned (2), based on which the following ratio was calculated.

Variation in surface resistance of conductive layer after heating at 250° C. for one min.

Variation (times)=(B)/(A)

(A): surface resistance of conductive layer at 25° C. under 60% RH (B): surface resistance of conductive layer at 25° C. under 60% RH after heating at 250° C. for one min.

(9) Transparency after Heating

The conductive laminate film was heated at 250° C. for one minute using a HIGH-TEMP OVEN PHH-1 manufactured by ESPEC. The film was irradiated with Brom video light, and transparency (presence or absence of whitening) was evaluated as follows (determination at 25° C., 60% RH).

No whitening in conductive layer: ○

Partial whitening in conductive layer: X

Synthesis Example 1

Preparation of Sulfonated Polyaniline Solution (SA)

2-Amino anisole-4-sulfonic acid (100 mmol) was dissolved in 4 moles/l of aqueous ammonia at 23° C. by stirring, and an aqueous solution of ammonium peroxodisulfate (100 mmol) was added dropwise. After the dropwise addition, the mixture was further stirred at 23°C. for 10 hr, and the reaction product was filtrated, washed and dried to give a powdery copolymer (13 g). This copolymer had a volume specific resistance of 12.3 Ω·cm. The above-mentioned polymer (3 parts by weight) was dissolved in 0.3 mole/l of aqueous sulfuric acid solution (100 parts by weight) by stirring at room temperature to give a sulfonated polyaniline solution. This sulfonated polyaniline had a sulfonic acid group content of 100%. The above-mentioned sulfonated polyaniline solution (2.0 parts by weight, solid content) was mixed with a mixture of water (50 parts by weight) and isopropanol (50 parts by weight).

Synthesis Example 2

Synthesis of Sulfonic Acid Group-Containing Polyester (A) and Preparation of Water/Alcohol Dispersion (Aaq) thereof Ester exchange and condensation polymerization were carried out by a conventional method, using, as a dicarboxylic acid component, dimethyl terephthalate (46 mol %), dimethyl isophthalate (47 mol %) and sodium 5-sulfoisophthalate (7 mol %) and, as a glycol component, ethylene glycol (50 mol %) and neopentyl glycol (50 mol %). The obtained sulfonic acid group-containing polyester (A) had a glass transition temperature of 69° C. The sulfonic acid group-containing polyester (300 parts) and n-butyl cellosolve (150 parts) were stirred with heating to give a viscous solution. Water (550 parts) was gradually added with stirring to give a pale-white uniform aqueous dispersion having a solid content of 30 wt %.

This dispersion was added to a mixed solution of equivalent amounts of water and isopropanol to give an aqueous dispersion of sulfonic acid group-containing polyester (hereinafter this dispersion is to be referred to as Aaq), having a solid content of 8 wt %.

Synthesis Example 3

Synthesis of Acrylic Graft Polyester (B) and Preparation of Aqueous Dispersion (Baq) thereof Dimethylterephthalate (5 moles), dimethylisophthalate (4.5 moles), ethyleneglycol (6.5 moles), neopentyl glycol (3.5 moles) and tetra-n-butylthitanate (0.002 mole) were charged in a stainless steel autoclave equipped with a stirrer, a thermometer and a partial reflux condenser, and ester exchange was carried out by elevating the temperature to 160–220° C. over 4 hr. Then, fumaric acid (0.5 mole) was added, and the mixture was heated to 200–220° C. over 1 hr. The reaction system was gradually depressurized, and the reaction was carried out under depressurization at 0.2 mmHg for 1.5 hr to give polyester (BO).

The above-mentioned polyester (BO) (300 parts), methyl ethyl ketone (360 parts) and isopropyl alcohol (120 parts) were placed in a reactor equipped with a stirrer, a thermometer, a refluxing device and quantitative titration device, and the mixture was stirred with heating to dissolve the resin by refluxing. After complete dissolution of the resin, a mixture of acrylic acid (35 parts), ethyl acrylate (65 parts) and octyl mercaptane (1.5 parts), and a solution of azobisisobutylonitrile (6 parts) dissolved in a mixture of methyl ethyl ketone (90 parts) and isopropyl alcohol (30 parts) were each added dropwise to the polyester solution over 1.5 hr, and allowed to react for 3 hr to give a graft polymer (B) solution. This graft polymer solution was cooled to room temperature, and triethylamine (59 parts) was added for neutralization. Then, ion exchange water (800 parts) was added and the mixture was stirred for 30 min. The remaining organic solvent was evaporated by heating to give an aqueous dispersion. This dispersion was added to a mixture of equivalent amounts of water and isopropanol to give an alcohol/water dispersion (Baq) having a solid content of 8 wt %.

<manufacture of Substrate Film>

A polyethyleneterephthalate, wherein fine particles of calcium carbonate having an average particle size of 0.5 μm had been dispersed at 4,000 ppm, was melt-extruded at 290° C. and cooled on a cooling roll at 30° C. to give an unoriented film having a thickness of about 180 μm. This unoriented film was drawn 3.5 times between a pair of rolls having different rolling speed and heated at 85° C. to give a substrate film having a thickness of about 50 μm.

EXAMPLE 1

The sulfonated polyaniline solution (SA) prepared in Synthesis Example 1 and Aaq prepared in Synthesis Example 2 were used in a solid content ratio (weight ratio) of SA/Aaq of 10/90, and a surfactant, Emulgen 810 (polyoxyethyleneoctylphenyl ether, manufactured by Kao Corporation) was used in a solid content ratio (weight ratio) of Emulgen/SA of 8/100 to prepare a coating solution for a conductive layer having a solid content of 4 wt %. The above-mentioned coating solution was applied onto the above-mentioned substrate film so that the thickness thereof after drying became about 10 μm, and dried. Then, the film was drawn 3.5 times in the transverse direction to give a conductive laminate film of the present invention.

EXAMPLE 2

In the same manner as in Example 1 except that Aaq was used in a solid content ratio (weight ratio) of SA/Aaq of 20/80, and the surfactant, Emulgen 810 (manufactured by Kao Corporation), was used in a solid content ratio (weight ratio) of Emulgen/SA of 30/100 to give a coating solution for a conductive layer, a conductive laminate film was prepared.

EXAMPLE 3

In the same manner as in Synthesis Example 2 except that dimethylterephthalate (93 mol %) and sodium 5-sulfoisophthalate (7 mol %) were used as an acid component and ethylene glycol (95 mol %) and polyethylene glycol (5 mol %) having a molecular weight of 1,000 were used as a glycol component, an aqueous dispersion of sulfonic acid group-containing polyester was prepared. Then, in the same manner as in Example 1 except that this aqueous dispersion was used instead of Aaq, a conductive laminate film was prepared.

EXAMPLE 3

In the same manner as in Synthesis Example 2 except that dimethylterephthalate (48 mol %), dimethylisophthalate (50 mol %) and sodium 5-sulfoisophthalate (2 mol %) were used as an acid component, an aqueous dispersion of sulfonic acid group-containing polyester was prepared. Then, in the same manner as in Example 1 except that this aqueous dispersion was used instead of Aaq, a conductive laminate film was prepared.

EXAMPLE 5

In the same manner as in Example 1 except that the aqueous dispersion of acrylic graft polyester (hereinafter this dispersion is to be referred to as Baq) prepared in Synthesis Example 3 was used instead of Aaq prepared in Synthesis Example 2, a conductive laminate film was prepared.

EXAMPLE 6

In the same manner as in Synthesis Example 2 except that dimethylterephthalate (93 mol %) and sodium 5-sulfoisophthalate (7 mol %) were used as an acid component and ethylene glycol (95 mol %) and polyethylene glycol (5 mol %) having a molecular weight of 10,000 were used as a glycol component, an aqueous dispersion of sulfonic acid group-containing polyester was prepared. Then, in the same manner as in Example 1 except that this aqueous dispersion was used instead of Aaq, a conductive laminate film was prepared.

EXAMPLE 7

In the same manner as in Synthesis Example 3 except that acrylic acid (4.2 parts) and ethyl acrylate (7.8 parts) were used, an aqueous dispersion of acrylic graft polyester was prepared. Then, in the same manner as in Example 1 except that this aqueous dispersion was used instead of Aaq, a conductive laminate film was prepared.

Comparative Example 1

In the same manner as in Example 1 except that an aqueous polyvinyl alcohol solution (concentration 8 wt %) was used instead of Aaq, a conductive laminate film was prepared.

Comparative Example 2

In the same manner as in Example 1 except that an aqueous sodium polyacrylate solution (concentration 8 wt %) was used instead of Aaq, a conductive laminate film was prepared.

Comparative Example 3

In the same manner as in Example 1 except that an anionic antistatic agent, Chemistat SA-9 (manufactured by SANYO CHEMICAL INDUSTRIES, LTD.) was used as a coating solution for a conductive layer, a conductive laminate film was prepared.

Comparative Example 4

In the same manner as in Example 1 except that a cationic antistatic agent, Chemistat 6300-H (manufactured by SANYO CHEMICAL INDUSTRIES, LTD.) was used as a coating solution for a conductive layer, a conductive laminate film was prepared.

Comparative Example 5

In the same manner as in Example 1 except that a coating solution was not applied, a conductive laminate film was prepared.

Comparative Example 6

A polyester resin solution prepared by dissolving polyester (BO) (8 parts) in methyl ethyl ketone (92 parts), and a sulfonated polyaniline solution prepared in Synthesis Example 1 were mixed to meet a solid content ratio (weight ratio) of 90/10 to give a coating solution for a conductive layer. Then, in the same manner as in Example 1 except that this solution was used instead of the solution used in Example 1, a conductive laminate film was prepared.

The conductive laminate films obtained in Examples 1–7 and Comparative Examples 1–6 were evaluated, the results of which are shown in Table 1 and Table 2. Tables 1, 2 reveal that every conductive laminate film obtained in Examples 1–7 was superior in antistatic properties, heat resistance, transparency (before and after heating), adhesion properties, resistance to scuffing, strike-through property and water resistance. On the other hand, the conductive laminate film obtained in Comparative Example 1 showed longer charge attenuation time and thus, poor antistatic properties. The surface resistance after heating and variation in surface resistance were greater, indicating poor heat resistance of this film. In addition, transparency after heating, adhesion properties and water resistance of this film were also poor. The conductive laminate film obtained in Comparative Example 2 showed greater variation in surface resistance, and thus, poor heat resistance, accompanied by insufficient adhesion properties and water resistance. The conductive laminate film obtained in Comparative Example 3 showed greater surface resistance under low humidity atmosphere and longer charge attenuation time, and thus, poor antistatic properties. The conductive laminate film obtained in Comparative Example 4 showed longer charge attenuation time, indicating insufficient antistatic properties, as well as greater surface resistance after heating and greater variation in surface resistance, and thus, poor heat resistance. Moreover, the film had poor transparency after heating. The conductive laminate film obtained in Comparative Example 5 showed greater surface resistance and longer charge attenuation time, so that it had no antistatic properties. The film showed greater surface resistance after heating, indicating poor heat resistance. The conductive laminate film obtained in Comparative Example 6 showed greater surface resistance after heating and greater variation in surface resistance, and thus, was insufficient in heat resistance.

TABLE 1

| | surface resistance ($\Omega/\square$) (25° C.) | | charge attenuation time | heat resistance | | transparency (after heating at 250° C. for 1 min) |
|---|---|---|---|---|---|---|
| | (15% RH) | (60% RH)(A) | (sec) | surface resistance after heating ($\Omega/\square$) (B) | variation in surface resistance (B)/(A) | |
| Ex. 1 | $4.1 \times 10^9$ | $3.6 \times 10^9$ | 0.05 | $3.4 \times 10^9$ | 0.94 | ○ |
| Ex. 2 | $8.2 \times 10^9$ | $6.0 \times 10^9$ | 0.05 | $5.7 \times 10^9$ | 0.95 | ○ |
| Ex. 3 | $9.6 \times 10^9$ | $7.3 \times 10^9$ | 0.04 | $7.6 \times 10^9$ | 1.04 | ○ |
| Ex. 4 | $9.5 \times 10^8$ | $9.7 \times 10^8$ | 0.05 | $8.8 \times 10^8$ | 0.91 | ○ |
| Ex. 5 | $3.1 \times 10^9$ | $2.6 \times 10^9$ | 0.04 | $7.6 \times 10^8$ | 0.29 | ○ |
| Ex. 6 | $5.2 \times 10^9$ | $5.0 \times 10^9$ | 0.05 | $3.7 \times 10^9$ | 0.74 | ○ |
| Ex. 7 | $6.5 \times 10^8$ | $8.7 \times 10^8$ | 0.05 | $\&.8 \times 10^8$ | 0.78 | ○ |
| Com. Ex. 1 | $4.8 \times 10^{11}$ | $1.5 \times 10^{11}$ | 2.3 | $>10^{13}$ | >66 | X |
| Com. Ex. 2 | $9.5 \times 10^{10}$ | $5.3 \times 10^{10}$ | 0.7 | $6.9 \times 10^{11}$ | 13.02 | ○ |
| Com. Ex. 3 | $>10^{13}$ | $3.9 \times 10^9$ | >10 | $6.3 \times 10^9$ | 1.62 | ○ |
| Com. Ex. 4 | $7.5 \times 10^{11}$ | $8.7 \times 10^8$ | 5.3 | $>10^{13}$ | >11494 | X |
| Com. Ex. 5 | $>10^{13}$ | $>10^{13}$ | >10 | $>10^{13}$ | — | ○ |
| Com. Ex. 6 | $2.5 \times 10^{11}$ | $2.5 \times 10^{11}$ | 1.6 | $7.5 \times 10^{12}$ | 30 | ○ |

TABLE 2

| | sulfonated polyaniline/ thermoplastic resin | surfactant/ sulfonated polyaniline | transparency | adhesion | scuffing resistance | strike through | water resistance |
|---|---|---|---|---|---|---|---|
| Ex. 1 | 10/90 (SO$_3$H-containing PES) | 8/100 | ○ | ○ | ○ | ○ | ○ |
| Ex. 2 | 20/80 (SO$_3$H-containing PES) | 30/100 | ○ | ○ | ○ | ○ | ○ |
| Ex. 3 | 10/90 (SO$_3$H-containing PES) | 8/100 | ○ | ○ | ○ | ○ | ○ |
| Ex. 4 | 10/90 (SO$_3$H-containing PES) | 8/100 | ○ | ○ | ○ | ○ | ○ |
| Ex. 5 | 10/90 (acrylic graft PES) | 8/100 | ○ | ○ | ○ | ○ | ○ |
| Ex. 6 | 10/90 (SO$_3$H-containing PES) | 8/100 | ○ | ○ | ○ | ○ | ○ |
| Ex. 7 | 10/90 (acrylic graft PES) | 8/100 | ○ | ○ | ○ | ○ | ○ |
| Com. Ex. 1 | 10/90 (polyvinyl alcohol) | 8/100 | ○ | X | ○ | ○ | X |
| Com. Ex. 2 | 10/90 (sodium polyacrylate) | 8/100 | ○ | Δ | ○ | ○ | Δ |
| Com. Ex. 3 | anionic antistatic agent | | ○ | ○ | ○ | ○ | ○ |
| Com. Ex. 4 | cationic antistatic agent | | ○ | ○ | ○ | ○ | ○ |
| Com. Ex. 5 | without coating | | ○ | — | ○ | ○ | ○ |
| Com. Ex. 6 | 10/90 (PES) | 8/100 | ○ | ○ | ○ | ○ | ○ |

Note: PES = polyester

EXAMPLE 8

In the same manner as in Example 1 except that Aaq was used in a solid content ratio (weight ratio) of SA/Aaq of 30/70, and the surfactant, Emulgen 810 (manufactured by Kao Corporation) was used in a solid content ratio (weight ratio) of Emulgen/SA of 8/100 to prepare a coating solution for a conductive layer, a conductive laminate film was prepared.

EXAMPLE 9

In the same manner as in Synthesis Example 1 except that an aqueous sulfuric acid solution (concentration 0.25 mole/l) was used, a sulfonated polyaniline solution was prepared. Then, in the same manner as in Synthesis Example 2 except that dimethylterephthalate (47 mol %), dimethylisophthalate (47 mol %) and sodium 5-sulfoisophthalate (6 mol %) were used as an acid component, an aqueous dispersion of sulfonic acid group-containing polyester was prepared. Then, in the same manner as in Example 1 except that the above-mentioned polyaniline solution was used instead of the sulfonated polyaniline solution (SA) and the above-mentioned aqueous dispersion was used instead of Aaq, a conductive laminate film was prepared.

EXAMPLE 10

In the same manner as in Example 1 except that Aaq was used in a solid content ratio (weight ratio) of SA/Aaq of 20/80, and the surfactant, Emulgen 810 (manufactured by Kao Corporation) was used in a solid content ratio (weight ratio) of Emulgen/SA of 40/100 to prepare a coating solution for a conductive layer, a conductive laminate film was prepared.

EXAMPLE 11

In the same manner as in Synthesis Example 1 except that an aqueous sulfuric acid solution (concentration 0.2 mole/l) was used, a sulfonated polyaniline solution (SA1) was prepared. Then, in the same manner as in Synthesis Example 2 except that dimethylterephthalate (48 mol %), dimethylisophthalate (47 mol %) and sodium 5-sulfoisophthalate (5 mol %) were used as an acid component, an aqueous dispersion of sulfonic acid group-containing polyester (hereinafter this dispersion is to be referred to as Aaq 1) was prepared. Then, in the same manner as in Example 1 except that the above-mentioned polyaniline solution (SA1) was used instead of the sulfonated polyaniline solution (SA) and the above-mentioned aqueous dispersion (Aaq 1) was used instead of Aaq and the aqueous dispersion was used in a solid content ratio (weight ratio) of SA1/Aaq 1 of 10/90, and the surfactant, Emulgen 810 (manufactured by Kao Corporation) was used in a solid content ratio (weight ratio) of Emulgen/SA1 of 50/100 to prepare a coating solution for a conductive layer, a conductive laminate film was prepared.

Comparative Example 7

In the same manner as in Synthesis Example 2 except that dimethylterephthalate (49 mol %), dimethylisophthalate (49 mol %) and sodium 5-sulfoisophthalate (2 mol %) were used as an acid component, an aqueous dispersion of sulfonic acid group-containing polyester was prepared. Then, in the same manner as in Example 1 except that the above-mentioned aqueous dispersion was used instead of Aaq, and the surfactant, Emulgen 810 (manufactured by Kao Corporation) was used in a solid content ratio (weight ratio) of Emulgen/SA of 40/100 to prepare a coating solution for a conductive layer, a conductive laminate film was prepared.

Comparative Example 8

In the same manner as in Synthesis Example 1 except that an aqueous sulfuric acid solution was not applied to give a sulfonated polyaniline solution, and this polyaniline solution was used instead of the sulfonated polyaniline solution (SA), a conductive laminate film was prepared.

Comparative Example 9

In the same manner as in Synthesis Example 1 except that an aqueous sulfuric acid solution was used in a concentration of 0.18 mole/l, a sulfonated polyaniline solution (SA2) was prepared. Then, in the same manner as in Example 1 except that this polyaniline solution (SA2) was used instead of the sulfonated polyaniline solution (SA), and the surfactant, Emulgen 810 (manufactured by Kao Corporation) was used in a solid content ratio (weight ratio) of Emulgen/SA2 of 600/100 to prepare a coating solution for a conductive layer, a conductive laminate film was prepared.

Comparative Example 10

In the same manner as in Example 1 except that Aaq was not added, a conductive laminate film was prepared.

The conductive laminate films obtained in Examples 8–11 and Comparative Examples 7–10 were evaluated, the results of which are shown in Table 3 and Table 4. Tables 3, 4 reveal that every conductive laminate film obtained in Examples 8–11 was superior in transparency, antistatic properties, adhesion properties, resistance to scuffing, strike-through property and water resistance. On the other hand, the films obtained in Comparative Examples 7–10 showed higher surface resistance and longer charge attenuation time, and thus were poor in antistatic properties. In addition, they showed higher surface resistance after heating and greater variations in surface resistance, so that they were poor in heat resistance. Moreover, the conductive laminate films obtained in Comparative Examples 7, 8 had whitened parts, thus impairing their transparency. The conductive laminate film obtained in Comparative Example 9 was associated with strike-through due to the excessive amount of surfactant added, insufficient transparency, resistance to scuffing and water resistance. The conductive laminate film obtained in Comparative Example 10 was poor in adhesion properties, resistance to scuffing, water resistance and transparency.

TABLE 3

| | surface resistance ($\Omega/\square$) (25° C.) | | charge attenuation time | heat resistance | |
|---|---|---|---|---|---|
| | | | | surface resistance after heating | variation in surface resistance (B)/(A) |
| | (15% RH) | (60% RH) (A) | (sec) | ($\Omega/\square$) (B) | |
| Ex. 8 | $3.7 \times 10^9$ | $2.4 \times 10^9$ | 0.04 | $2.2 \times 10^9$ | 0.92 |
| Ex. 9 | $1.4 \times 10^{10}$ | $9.2 \times 10^9$ | 0.05 | $8.9 \times 10^9$ | 0.97 |
| Ex. 10 | $7.5 \times 10^9$ | $5.9 \times 10^9$ | 0.05 | $6.1 \times 10^9$ | 1.03 |
| Ex. 11 | $4.3 \times 10^{10}$ | $2.1 \times 10^{10}$ | 0.05 | $1.8 \times 10^{10}$ | 0.86 |
| Com. Ex. 7 | $2.1 \times 10^{12}$ | $1.3 \times 10^{12}$ | 3.4 | $1.7 \times 10^{12}$ | 1.31 |
| Com. Ex. 8 | $6.4 \times 10^{12}$ | $3.2 \times 10^{12}$ | 4.1 | $4.1 \times 10^{12}$ | 1.28 |
| Com. Ex. 9 | $>10^{13}$ | $6.5 \times 10^{12}$ | >10 | $8.3 \times 10^{12}$ | 1.28 |
| Com. Ex. 10 | $>10^{13}$ | $>10^{13}$ | >10 | $>10^{13}$ | — |

TABLE 4

| | percentage of —SO$_3$H in sulfonated polyaniline | percentage of —SO$_3$Na in SO$_3$H-containing PES | sulfonated polyaniline/SO$_3$H-containing PES | surfactant/ sulfonated polyaniline | transparency | adhesion | scuffing resistance | strike through | water resistance |
|---|---|---|---|---|---|---|---|---|---|
| Ex. 8 | 100% | 7% | 30/70 | 8/100 | ○ | ○ | ○ | ○ | ○ |
| Ex. 9 | 95% | 6% | 30/70 | 8/100 | ○ | ○ | ○ | ○ | ○ |
| Ex. 10 | 100% | 7% | 20/80 | 40/100 | ○ | ○ | ○ | ○ | ○ |
| Ex. 11 | 80% | 5% | 10/90 | 50/100 | ○ | ○ | ○ | ○ | ○ |
| Com. Ex. 7 | 100% | 2% | 10/90 | 40/100 | X | ○ | ○ | ○ | ○ |
| Com. Ex. 8 | 20% | 7% | 10/90 | 8/100 | X | ○ | ○ | ○ | ○ |
| Com. Ex. 9 | 75% | 7% | 10/90 | 600/10 | Δ | ○ | Δ | X | Δ |
| Com. Ex. 10 | 100% | — | 100/0 | 8/100 | Δ | X | X | ○ | X |

Note: PES = polyester

EXAMPLE 12

In the same manner as in Example 1 except that Aaq was used in a solid content ratio (weight ratio) of SA/Aaq of 20/80, and the surfactant, Emulgen 810 (manufactured by Kao Corporation) was used in a solid content ratio (weight ratio) of Emulgen/SA of 5/100 to prepare a coating solution for a conductive layer, a conductive laminate film was prepared.

EXAMPLE 13

In the same manner as in Synthesis Example 1 except that the concentration of the aqueous sulfuric acid solution was adjusted to 0.50 mole/l, a sulfonated polyaniline solution was prepared, and in the same manner as in Synthesis Example 2 except that dimethylterephthalate (47 mol %), dimethylisophthalate (48 mol %) and sodium 5-sulfoisophthalate (5 mol %) were used as an acid component, an a of sulfonic acid group-containing polyester was prepared. In the same manner as in Example 1 except that the above-mentioned polyaniline solution was used in the place of the sulfonated polyaniline solution (SA) and the above-mentioned aqueous dispersion was used in the place of Aaq, a conductive laminate film was prepared.

EXAMPLE 14

In the same manner as in Example 1 except that Aaq was used in a solid content ratio (weight ratio) of SA/Aaq of 30/70, and the surfactant, Emulgen 810 (manufactured by Kao Corporation) was used in a solid content ratio (weight ratio) of Emulgen/SA of 30/100 to prepare a coating solution for a conductive layer, a conductive laminate film was prepared.

EXAMPLE 15

In the same manner as in Synthesis Example 2 except that the solid content of the aqueous dispersion of sulfonic acid group-containing polyester was adjusted to 1 wt %, an aqueous dispersion of sulfonic acid group-containing polyester was prepared. In the same manner as in Example 1 except that the above-mentioned aqueous dispersion was used in the place of Aaq and a biaxially oriented film (trademark E5100, manufactured by Toyo Boseki Kabushiki Kaisha) was used as a substrate film and dried at 160° C. for one min, a conductive laminate film was prepared.

Comparative Example 11

In the same manner as in Example 1 except that an anionic antistatic agent, Chemistat SA-9 (manufactured by SANYO CHEMICAL INDUSTRIES, LTD.) was used as a coating solution for a conductive layer, a conductive laminate film was prepared.

Comparative Example 12

In the same manner as in Example 1 except that a cationic antistatic agent, Chemistat 6300-H (manufactured by SANYO CHEMICAL INDUSTRIES, LTD.) was used as a coating solution for a conductive layer, a conductive laminate film was prepared.

Comparative Example 13

In the same manner as in Example 4 except that an anionic antistatic agent, Chemistat SA-9 (manufactured by SANYO CHEMICAL INDUSTRIES, LTD.) was used as a coating solution for a conductive layer, a conductive laminate film was prepared.

Comparative Example 14

In the same manner as in Example 4 except that a cationic antistatic agent, Chemistat 6300-H (manufactured by SANYO CHEMICAL INDUSTRIES, LTD.) was used as a coating solution for a conductive layer, a conductive laminate film was prepared.

The conductive laminate films obtained in Examples 12–15 and Comparative Examples 11–14 were evaluated, the results of which are shown in Table 5. Table 5 reveals that every conductive laminate film obtained in Examples 12–15 showed low surface resistance even under low humidity, and thus, sufficient antistatic properties, as well as superior heat resistance and transparency after heating. On the other hand, the conductive laminate films obtained in Comparative Examples 11, 13 showed high surface resistance under low humidity and longer charge attenuation time, and therefore, poor antistatic properties. The conductive laminate film obtained in Comparative Example 12 showed rather high surface resistance under low humidity and thus, had insufficient antistatic properties. In addition, this film did not show heat resistance, which resulted in poor transparency after heating. The conductive laminate film obtained in Comparative Example 14 neither had heat resistance, and showed poor transparency after heating.

EXAMPLE 18

In the same manner as in Example 16 except that Baq of Synthesis Example 3 was used in the place of Aaq of Synthesis Example 2, a conductive nonwoven fabric was prepared.

EXAMPLE 19

In the same manner as in Example 16 except that the solid content of the coating solution was adjusted to 1 wt %, a conductive nonwoven fabric was prepared.

Comparative Example 15

In the same manner as in Example 16 except that an anionic antistatic agent, Chemistat SA-9 (manufactured by SANYO CHEMICAL INDUSTRIES, LTD.) was used as a coating solution for a conductive layer, a conductive nonwoven fabric was prepared.

Comparative Example 16

In the same manner as in Example 16 except that a cationic antistatic agent, Chemistat 6300-H (manufactured

TABLE 5

| | | surface resistance ($\Omega/\square$) (25° C.) | | charge attenuation time | heat resistance | | transparency (after heating at 250° C. |
|---|---|---|---|---|---|---|---|
| | conductive layer | (15% RH) | (60% RH) (A) | (sec) | surface resistance after heating ($\Omega/\square$) (B) | variation in surface resistance (B)/(A) | for 1 min) |
| Ex. 12 | sulfonated polyaniline + SO$_3$H-containing PES | $3.0 \times 10^9$ | $2.1 \times 10^9$ | 0.04 | $3.0 \times 10^9$ | 1.43 | ○ |
| Ex. 13 | sulfonated polyaniline + SO$_3$H-containing PES | $7.4 \times 10^9$ | $5.2 \times 10^9$ | 0.05 | $5.4 \times 10^9$ | 1.04 | ○ |
| Ex. 14 | sulfonated polyaniline + SO$_3$H-containing PES | $4.6 \times 10^9$ | $3.8 \times 10^9$ | 0.05 | $3.5 \times 10^9$ | 0.92 | ○ |
| Ex. 15 | sulfonated polyaniline + SO$_3$H-containing PES | $8.5 \times 10^8$ | $7.1 \times 10^8$ | 0.05 | $7.8 \times 10^8$ | 1.10 | ○ |
| Com. Ex. 11 | anionic antistatic agent | $>10^{13}$ | $5.2 \times 10^9$ | >10 | $8.3 \times 10^9$ | 1.60 | ○ |
| Com. Ex. 12 | cationic antistatic agent | $9.2 \times 10^{12}$ | $6.8 \times 10^9$ | 0.7 | $>10^{13}$ | >1470 | X |
| Com. Ex. 13 | anionic antistatic agent | $>10^{13}$ | $4.7 \times 10^9$ | >10 | $6.9 \times 10^9$ | 1.47 | ○ |
| Com. Ex. 14 | cationic antistatic agent | $8.4 \times 10^{11}$ | $9.4 \times 10^8$ | 1.2 | $>10^{13}$ | >10638 | X |

Note: PES = polyester

<manufacture of Nonwoven Substrate>

A polyethylene terephthalate having an intrinsic viscosity of 0.63 which contained sodium alkylbenzenesulfonate (0.4 wt %) and titanium oxide (0.04 wt %) was melted at 290° C., extruded from a nozzle by a conventional method onto a net type conveyor, pressed with an emboss roll, and wound up to give a predetermined nonwoven fabric.

EXAMPLE 16

The above-mentioned nonwoven fabric substrate was subjected to dip-coating with a coating solution similar to that used in Example 1 to give a conductive nonwoven fabric.

EXAMPLE 17

In the same manner as in Example 16 except that Aaq was used in a solid content ratio (weight ratio) of SA/Aaq of 20/80, a conductive nonwoven fabric was prepared.

by SANYO CHEMICAL INDUSTRIES, LTD.) was used as a coating solution for a conductive layer, a conductive nonwoven fabric was prepared.

Comparative Example 17

A nonwoven fabric substrate was evaluated without applying a coating solution for a conductive layer.

The conductive nonwoven fabrics obtained in Examples 16–19 and Comparative Examples 15–17 were evaluated, the results of which are shown in Table 6. Table 6 reveals that every nonwoven fabric obtained in Examples 16–19 showed low surface resistance even under low temperatures, and thus, sufficient antistatic properties, as well as superior heat resistance and adhesion properties. On the other hand, the conductive nonwoven fabric obtained in Comparative Example 15 showed high surface resistance under low humidity and longer charge attenuation time, and therefore, poor antistatic properties. The conductive nonwoven fabric obtained in Comparative Example 16 showed rather high surface resistance under low humidity and thus, insufficient antistatic properties. In addition, this film had poor heat resistance. The conductive nonwoven fabric obtained in Comparative Example 17 was poor in antistatic properties and heat resistance.

TABLE 6

| | conductive layer | surface resistance ($\Omega/\square$) (25° C.) | | charge attenuation time | heat resistance | | adhesion |
|---|---|---|---|---|---|---|---|
| | | (15% RH) | (60% RH) (A) | (sec) | surface resistance after heating ($\Omega/\square$) (B) | variation in surface resistance (B)/(A) | |
| Ex. 16 | sulfonated polyaniline + SO$_3$H-containing PES | $7.0 \times 10^9$ | $6.1 \times 10^9$ | 0.05 | $7.2 \times 10^9$ | 1.18 | ○ |
| Ex. 17 | sulfonated polyaniline + SO$_3$H-containing PES | $2.1 \times 10^9$ | $1.3 \times 10^9$ | 0.04 | $3.1 \times 10^9$ | 2.38 | ○ |
| Ex. 18 | sulfonated polyaniline + acrylic graft PES | $8.6 \times 10^9$ | $7.8 \times 10^9$ | 0.05 | $8.5 \times 10^9$ | 1.09 | ○ |
| Ex. 19 | sulfonated polyaniline + SO$_3$H-containing PES | $2.5 \times 10^{10}$ | $1.1 \times 10^{10}$ | 0.06 | $2.8 \times 10^{10}$ | 2.55 | ○ |
| Com. Ex. 15 | anionic antistatic agent | $>10^{13}$ | $5.2 \times 10^9$ | >10 | $8.3 \times 10^9$ | 1.60 | ○ |
| Com. Ex. 16 | cationic antistatic agent | $3.2 \times 10^{12}$ | $6.1 \times 10^9$ | 1.8 | $>10^{13}$ | >1639 | ○ |
| Com. Ex. 17 | none | $>10^{13}$ | $>10^{13}$ | >10 | $>10^{13}$ | — | — |

Note: PES = polyester

<manufacture of raw yarn>

A polyethylene terephthalate having an intrinsic viscosity of 0.63 which contained sodium alkylbenzenesulfonate (0.4 wt %) and titanium oxide (0.04 wt %) was melted at 290° C., extruded from a nozzle by a conventional method to give an extrudate filament.

EXAMPLE 20

To the surface of the above-mentioned filament was applied a coating solution similar to that used in Example 1, using a guide roll, and the filament was wound up at a rate of 1,500 m/min. Then, this unoriented filament was heat drawn at drawing temperature of 90° C. and heat treatment temperature of 150° C. and wound up to give a conductive filament. The obtained conductive filament was processed into plain weave fabric to give a conductive fabric.

EXAMPLE 21

In the same manner as in Example 20 except that the sulfonated polyaniline solution (SA) and Aaq were mixed in a solid content ratio (weight ratio) of SA/Aaq of 20/80, a conductive plain weave fabric was obtained.

EXAMPLE 22

In the same manner as in Example 20 except that Baq of Synthesis Example 3 was used in the place of Aaq of Synthesis Example 2, a conductive plain weave fabric was obtained.

EXAMPLE 23

In the same manner as in Example 20 except that the solid content of the coating solution was adjusted to 1 wt %, a conductive plain weave fabric was prepared.

Comparative Example 18

In the same manner as in Example 20 except that an anionic antistatic agent, Chemistat SA-9 (SANYO CHEMICAL INDUSTRIES, LTD.) was used as a coating solution for a conductive layer, a conductive plain weave fabric was obtained.

Comparative Example 19

In the same manner as in Example 20 except that a cationic antistatic agent, Chemistat 6300-H (SANYO CHEMICAL INDUSTRIES, LTD.) was used as a coating solution for a conductive layer, a conductive plain weave fabric was obtained.

Comparative Example 20

In the same manner as in Example 20 except that a plain weave fabric was prepared from a raw yarn without applying a coating solution, a plain weave fabric was obtained.

The conductive plain weave fabrics obtained in Examples 20–23 and Comparative Examples 18–20 were evaluated, the results of which are shown in Table 7. Table 7 reveals that every plain weave fabric obtained in Examples 20–23 showed low surface resistance even under low temperatures and shorter charge attenuation time, and thus, sufficient antistatic properties, as well as superior heat resistance and adhesion properties. On the other hand, the conductive plain weave fabric obtained in Comparative Example 18 showed high surface resistance under low humidity, and longer charge attenuation time, and therefore, poor antistatic properties. The conductive plain weave fabric obtained in Comparative Example 19 showed rather high surface resistance under low humidity, insufficient antistatic properties and poor heat resistance. The conductive plain weave fabric obtained in Comparative Example 20 was poor in antistatic properties and heat resistance.

TABLE 7

| | conductive layer | surface resistance ($\Omega/\square$) (25° C.) | | charge attenuation time | heat resistance | | adhesion |
| --- | --- | --- | --- | --- | --- | --- | --- |
| | | (15% RH) | (60% RH) (A) | (sec) | surface resistance after heating ($\Omega/\square$) (B) | variation in surface resistance (B)/(A) | |
| Ex. 20 | sulfonated polyaniline + SO$_3$H-containing PES | $9.0 \times 10^9$ | $8.2 \times 10^9$ | 0.05 | $9.3 \times 10^9$ | 1.13 | ○ |
| Ex. 21 | sulfonated polyaniline + SO$_3$H-containing PES | $5.3 \times 10^9$ | $5.0 \times 10^9$ | 0.04 | $5.1 \times 10^9$ | 1.02 | ○ |
| Ex. 22 | sulfonated polyaniline + acrylic graft PES | $9.8 \times 10^9$ | $9.1 \times 10^9$ | 0.05 | $1.4 \times 10^{10}$ | 1.54 | ○ |
| Ex. 23 | sulfonated polyaniline + SO$_3$H-containing PES | $5.4 \times 10^{10}$ | $4.8 \times 10^{10}$ | 0.07 | $5.7 \times 10^{10}$ | 1.19 | ○ |
| Com. Ex. 18 | anionic antistatic agent | $>10^{13}$ | $8.2 \times 10^9$ | $>10$ | $9.7 \times 10^9$ | 1.18 | ○ |
| Com. Ex. 19 | cationic antistatic agent | $6.7 \times 10^{12}$ | $8.9 \times 10^9$ | 1.8 | $>10^{13}$ | $>1124$ | ○ |
| Com. Ex. 20 | none | $>10^{13}$ | $>10^{13}$ | $>10$ | $>10^{13}$ | — | — |

Note: PES = polyester

As is evident from the foregoing description, the conductive laminate of the present invention is superior in transparency and exhibits superior antistatic properties under low humidity. Moreover, it has sufficient heat resistance. Therefore, the inventive conductive laminate is suitable as various industrial films, such as magnetic tape, OHP film, shield material, LCD and the like; various packaging films, such as carrier tape, tray, magazine, IC.LSI package and the like; clothing fibers, such as antistatic work clothing, uniform, sanitary gown and the like; fibers for interior fiber products, such as carpet, curtain, upholstery and the like; fibers for automobile interior materials, such as car seat, seat belt, floor mat, ceiling material and the like; fibers for hat and bag; fibers for fiber products for industrial material; sheet made from said fiber; and the like.

This application is based on application No. 8-89544 filed in Japan, the content of which is incorporated hereinto by reference.

What is claimed is:

1. A conductive laminate comprising an inorganic or organic substrate and a conductive layer formed on at least a part of a surface of said substrate, the conductive layer having a surface resistance at 25° C., under 15% RH atmosphere of $10^6$–$10^{12}$ $\Omega/\square$, a charge attenuation time of not more than 2 seconds and a variation in surface resistance after heating at 250° C. for one minute of not more than 5.0;
   wherein said conductive layer comprises a conductive polymer and a thermoplastic resin.

2. The conductive laminate of claim 1, wherein the conductive layer farther comprises a surfactant.

3. The conductive laminate of claim 1, wherein the inorganic or organic substrate is a film or sheet.

4. The conductive laminate of claim 1, wherein the inorganic or organic substrate is a fiber.

5. The conductive laminate of claim 2, wherein the conductive polymer is a polyaniline or a compund comprising an aniline structure.

6. The conductive laminate of claim 3, wherein the film or sheet is thermoplastic.

7. The conductive laminate of claim 5, wherein the polyaniline has a sulfonic acid group.

8. The conductive laminate of claim 5, wherein the polyaniline is a copolymer comprising an alkoxy-substituted amino benzenesulfonic acid as a main component.

9. The conductive laminate of claim 5, wherein the polyaniline is a copolymer comprising an aminoanisole-sulfonic acid as a main component.

10. The conductive laminate of claim 1, wherein the thermoplastic resin has a hydrophilic group.

11. The conductive laminate of claim 1, wherein the thermoplastic resin has at least one group selected from the group consisting of an ionic group, a carboxyl group, a hydroxyl group, a sulfonic acid group, an amide group, an acid anhydride group, a glycidyl group, a chlorine atom and a polyalkylene glycol group.

12. The conductive laminate of claim 1, wherein the thermoplastic resin is a water soluble or water dispersible resin having an anionic group.

13. The conductive laminate of claim 1, wherein the thermoplastic resin is a copolymerized polyester having at least one member selected from the group consisting of a sulfonic acid group and an alkali metal salt group thereof.

14. The conductive laminate of claim 1, wherein the thermoplastic resin is a copolymerized polyester obtained by copolymerizing at least one member selected from the group consisting of 5-sulfoisophthalic acid and 5-alkalisulfoisophthalate in a proportion of 1–10 mol % of the entire acid component.

15. The conductive laminate of claim 6, wherein the thermoplastic film or sheet is made from a member selected from the group consisting of polyester, polyamide, polyolefin and polystyrene.

16. The conductive laminate of claim 6, wherein the thermoplastic film or sheet is a multi-layer film or sheet.

17. The conductive laminate of claim 15, wherein the film or sheet has voids.

* * * * *

UNITED STATES PATENT AND TRADEMARK OFFICE
CERTIFICATE OF CORRECTION

PATENT NO. : 6,017,610
DATED : January 25, 2000
INVENTOR(S) : Kazuhiro Abe et al.

It is certified that error appears in the above-identified patent and that said Letters Patent is hereby corrected as shown below:

On the title page, before Line [51], please add:

Line [30] Foreign Application Priority Data

April 11, 1996 [JP] Japan......................08/89544

Signed and Sealed this

Twelfth Day of June, 2001

*Attest:*

NICHOLAS P. GODICI
*Attesting Officer*     *Acting Director of the United States Patent and Trademark Office*